(12) United States Patent
Vazquez et al.

(10) Patent No.: US 7,831,960 B2
(45) Date of Patent: Nov. 9, 2010

(54) CONFIGURATION TOOL WITH MULTI-LEVEL PRIORITY SEMANTIC

(75) Inventors: Pedro Vazquez, Saint-Ismier (FR); Alejandro P. Lopez, Saint-Ismier Cedex (FR); Pablo Martikian, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 1189 days.

(21) Appl. No.: 11/449,355

(22) Filed: Jun. 8, 2006

(65) Prior Publication Data

US 2007/0288895 A1 Dec. 13, 2007

(51) Int. Cl.
*G06F 9/44* (2006.01)

(52) U.S. Cl. ............... 717/121; 717/106; 717/112; 717/143; 710/265; 710/267; 710/244; 710/264

(58) Field of Classification Search ............ 717/106, 717/121, 129, 112, 143; 710/200, 244, 260, 710/264, 267, 265
See application file for complete search history.

(56) References Cited

U.S. PATENT DOCUMENTS

| | | | | |
|---|---|---|---|---|
| 5,182,811 A | * | 1/1993 | Sakamura ............ | 710/264 |
| 5,218,703 A | * | 6/1993 | Fleck et al. ............ | 710/264 |
| 5,247,683 A | * | 9/1993 | Holmes et al. ............ | 709/221 |
| 5,524,247 A | * | 6/1996 | Mizuno ............ | 710/200 |
| 5,613,129 A | * | 3/1997 | Walsh ............ | 710/267 |
| 5,659,759 A | * | 8/1997 | Yamada ............ | 710/265 |
| 5,684,994 A | * | 11/1997 | Tanaka et al. ............ | 717/153 |
| 5,768,568 A | * | 6/1998 | Inui et al. ............ | 710/16 |
| 5,790,862 A | * | 8/1998 | Tanaka et al. ............ | 717/159 |
| 5,838,975 A | * | 11/1998 | Abramson et al. ............ | 717/129 |
| 5,864,700 A | * | 1/1999 | Barton et al. ............ | 717/156 |
| 5,996,058 A | * | 11/1999 | Song et al. ............ | 712/31 |
| 6,021,498 A | * | 2/2000 | Wisor et al. ............ | 713/300 |
| 6,041,177 A | * | 3/2000 | Kawabe et al. ............ | 717/125 |
| 6,128,730 A | * | 10/2000 | Levine ............ | 713/1 |
| 6,240,544 B1 | * | 5/2001 | Kaneko ............ | 717/135 |
| 6,735,690 B1 | * | 5/2004 | Barry et al. ............ | 712/244 |
| 6,901,439 B1 | * | 5/2005 | Bonasia et al. ............ | 709/220 |
| 6,963,613 B2 | * | 11/2005 | MacInnis et al. ....... | 375/240.25 |
| 6,971,096 B1 | * | 11/2005 | Ankireddipally et al. .... | 718/101 |
| 7,206,903 B1 | * | 4/2007 | Moir et al. ............ | 711/145 |
| 7,222,218 B2 | * | 5/2007 | Dutt et al. ............ | 711/125 |
| 7,380,039 B2 | * | 5/2008 | Miloushev et al. ............ | 710/244 |
| 2003/0172109 A1 | * | 9/2003 | Dalton et al. ............ | 709/203 |
| 2005/0188358 A1 | * | 8/2005 | Johnson et al. ............ | 717/129 |

(Continued)

OTHER PUBLICATIONS

Title: Performability modeling of N version programming technique, source: IEEE, author: Goseva-Popstojanova, K et al, dated: Oct. 27, 1995.*

(Continued)

*Primary Examiner*—Chameli C Das
(74) *Attorney, Agent, or Firm*—Osha • Liang LLP

(57) ABSTRACT

A method for configuration of a program with a plurality of configuration variables to operate on a computer system that includes obtaining a plurality of priority semantics for the plurality of configuration variables, wherein the plurality of priority semantics are heterogeneous, assigning a value for each of the plurality of configuration variables based on the plurality of priority semantics, and configuring the program using the value to operate on the computer system.

18 Claims, 5 Drawing Sheets

U.S. PATENT DOCUMENTS

2006/0056517 A1* 3/2006 MacInnis et al. ....... 375/240.23
2006/0159007 A1* 7/2006 Frutiger et al. ............. 370/216
2007/0033273 A1* 2/2007 White et al. ................ 709/223

OTHER PUBLICATIONS

Title: A structured menu of software configuration management, source: IEEE, author: McDonough, J.A, dated: May 28, 1993.*

Title: A new configuration management model for software based on distributed components and layered architecture, author: Ruan Li, source: IEEE, dated: Aug. 29, 2003.*

* cited by examiner

CONFIGURATION TOOL WITH MULTI-LEVEL PRIORITY SEMANTIC

BACKGROUND

The typical computer system includes hardware (such as processor and memory) and software (such as the applications and operating systems) that execute on the hardware. An execution environment of the program corresponds to the hardware and software that execute with and affect the execution of the program. For example, the execution environment of a web browser includes the networking interfaces, operating system, and hardware.

In order for a program to operate in the execution environment defined by the computer system, the program is typically configured for the execution environment. Specifically, a developer of the program embeds a variety of configuration variables within the program. The configuration variables define how a program operates in the execution environment. The values for the configuration variables are based on the execution environment of the program, preferences of an individual installing and/or using the program, etc. The program can obtain the values for the configuration variables during execution of the program.

Some programs use a configuration file for holding the configuration values. The individual installing the program or the using the program can modify the configuration file to set the values for the configuration variables.

Typically, programs typically have multiple sources for obtaining the value for a configuration variable. For example, the configuration values may be set in a configuration file, as environmental variables, in a script, etc. During execution the program obtains the configuration values. Because multiple conflicting sources may exist for the values of a configuration variable, a single priority semantic is set for all configuration variables. A priority semantic specifies an ordering of the values of the configuration variables. If a value exists and has the highest priority, then the value is used for the configuration of the program.

The typical priority semantic is hierarchical. Specifically, the nearer a value is to the user of the program, the more priority exists for using the value. For example, a value set in the command line is given a higher priority than a default value. Accordingly, if a command line value exists, then the command line value is used regardless of whether the default value exists. Conversely, if a command line value does not exist, then the default value is used.

SUMMARY

In general, in one aspect, the invention relates to a method for configuration of a program with a plurality of configuration variables to operate on a computer system that includes obtaining a plurality of priority semantics for the plurality of configuration variables, wherein the plurality of priority semantics are heterogeneous, assigning a value for each of the plurality of configuration variables based on the plurality of priority semantics, and configuring the program using the value to operate on the computer system.

In general, in one aspect, the invention relates to a data structure for a configuration variable of a program that includes a first element that includes a first argument identifying a first level associated with a first value for the configuration variable, a second element that includes a second argument identifying a second level associated with a second value for the configuration variable, wherein the data structure defines a priority semantic between the first value and the second value, and wherein the priority semantic is used to configure a program to operate on a computer system.

In general, in one aspect, the invention relates to a computer usable medium having computer readable program code embodied therein for causing a computer system to obtain a plurality of priority semantics for the plurality of configuration variables, wherein the plurality of priority semantics are heterogeneous, assign a value for each of the plurality of configuration variables based on the plurality of priority semantics, and configure the program using the value to operate on the computer system.

Other aspects of the invention will be apparent from the following description and the appended claims.

DETAILED DESCRIPTION

Figure 1:
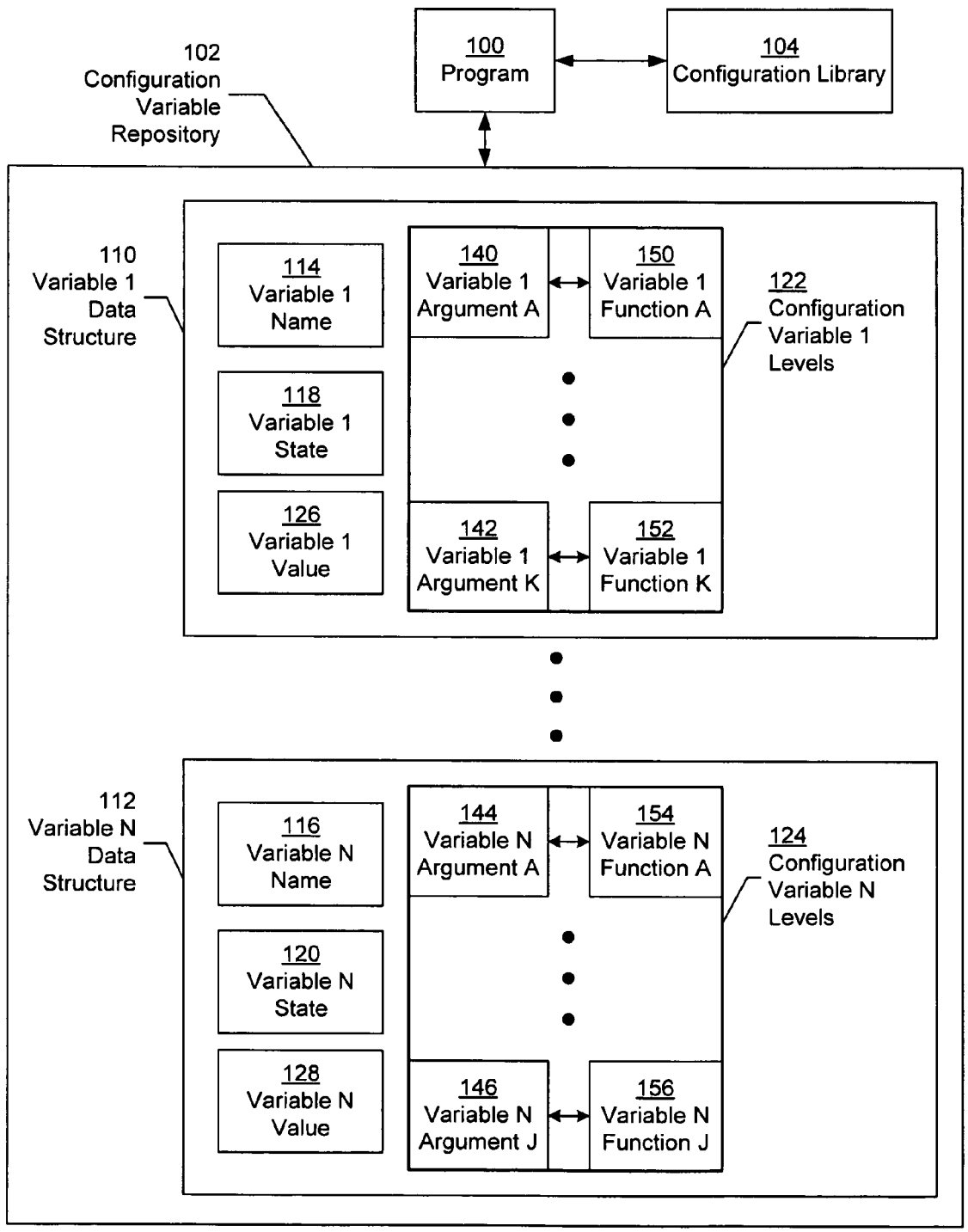
FIG. 1 shows a schematic diagram of a system for configuration of a program in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for creating a priority semantic and assigning values to the configuration variables based on the priority semantic. Specifically, in one or more embodiments of the invention, the priority semantic used for any single configuration variable is configurable. More specifically, each configuration variable has a separate priority semantic that can be set by the developer of the application. Thus, the priority semantic of values that are assigned to the configuration variable are based on the developer and the configuration variable.

FIG. 1 shows a schematic diagram of a system for configuration of a program in accordance with one or more embodiments of the invention. As shown in FIG. 1, the system includes a program (100), configuration variable repository (102), and configuration library functions (104). Each of these components is described below.

The program (100) corresponds to any software for a computer system in accordance with one or more embodiments of the invention. For example, the program (100) may correspond to a user-level application, such as a web browser, word processor, web server, or an operating system application. A computer system (not shown) corresponds to any type of device that includes functionality to execute a program. For example, the computer system may correspond to a personal computer, server, single processor, embedded device, or any other similar device.

Embedded within the program (100) are various configuration variables (not shown). A configuration variable corresponds to a variable referred to in a program (100) that has an unknown definite value at the time the program (100) is developed. Specifically, the value of the configuration variable is used in place of the configuration variable during execution of the program (100). The value may be default or come from a variety of other sources.

A configuration variable identifies how and whether a program (100) operates on a computer system. For example, the value of the configuration variable may correspond to a port number of a port (not shown) to interface with a network (not shown), a password, security settings, etc. The value of the configuration variable may be derived from an individual's preference or to the execution environment of the program (100).

Continuing with FIG. 1, a configuration variable repository (102) is connected to the program (100). A configuration variable repository (102) corresponds to a storage unit for maintaining information about a configuration variable (110). The configuration variable repository (102) may, for example, correspond to a data structure (e.g., vector, array, tree, etc.), a file, a file system, database, or virtually any other storage unit of data.

The configuration variable repository (102) maintains one or more configuration variable data structures (e.g., variable 1 data structure (110), variable n data structure (112)). Specifically, the configuration variable repository (102) provides direct or indirect access to the configuration variable data structures (e.g., variable 1 data structure (110), variable n data structure (112)).

A configuration variable data structure (e.g., variable 1 data structure (110), variable n data structure (112)) corresponds to a data structure for maintaining information about a configuration variable. For example, the configuration variable data structure may correspond to a programming language "Struct" or object defined by a developer. Alternatively, the configuration variable data structure may correspond to a data structure, such as an array, stack, linked list, etc.

The configuration variable data structure (e.g., variable 1 data structure (110), variable n data structure (112)) includes a variable name (e.g., variable 1 name (114), variable n name (116)), a variable state (e.g., variable 1 state (118), variable n state (120)), configuration variable levels (e.g., configuration variable 1 levels (122), configuration variable n levels (124)), and a variable value (e.g., variable 1 value (126), variable n value (128)). Each of these components is described below.

A variable name (e.g., variable 1 name (114), variable n name (116)) corresponds to an identification mechanism for the configuration variable used within the program (100). Specifically, the configuration variable name corresponds to an alphanumeric string for representing the configuration variable.

In one or more embodiments of the invention, a configuration variable actually has two names in the configuration variable repository. The first name corresponds to the name given by the developer when creating an instantiation of the variable data structure. Specifically, the first name may correspond to the naming scheme used by the developer, such as "ipBlobSecName" to name an integer pointer to a blob structure that contains the names of sectors. More specifically, the instantiation of the data structure has a name.

The second name corresponds to the variable name (e.g., variable 1 name (114), variable n name (116)) that is used within the configuration variable data structure (e.g., variable 1 data structure (110), variable n data structure (112)). In one or more embodiments of the invention, the variable name (e.g., variable 1 name (114), variable n name (116)) is unique within the configuration variable repository (102). Further, the variable name (e.g., variable 1 name (114), variable n name (116)) corresponds to a familiar name for a variable. For example, rather than having the name "ipBlobSecName", the variable name may correspond to "Sector Names."

The existence of two variable names allows for a program (100) and a user to communicate through natural names. Specifically, the program (100) is generally constrained by the naming scheme of a company developing the program (100). Such names generated by the naming scheme are often non-intuitive to a user or developer. Thus, when referring to the configuration variable in the program (100), the name defined by the naming scheme can be used. In contrast, when assigning values to the configuration variable, a developer or user can use the variable name (e.g., variable 1 name (114), variable n name (116)).

Continuing with FIG. 1, each configuration variable data structure (e.g., configuration variable 1 data structure (110), configuration variable n data structure (112)) includes a variable state (e.g., variable 1 state (118), variable n state (120)). In one or more embodiments of the invention, the variable state (e.g., variable 1 state (118), variable n state (120)) maintains information regarding the status of the configuration variable. The variable state (e.g., variable 1 state (118), variable n state (120)) may correspond to any type of variable, such as an integer, character string, object, etc.

Further, in one or more embodiments of the invention, the variable state (e.g., variable 1 state (118), variable n state (120)) represents the status of mandatory variable, mandatory and set variable, set variable, or none of the previous. A mandatory variable corresponds to a configuration variable that value is required in order to execute the program. A set variable corresponds to a configuration variable that has a value.

In one or more embodiments of the invention, the variable state (e.g., variable 1 state (118), variable n state (120)) is implemented as flags that can be switched on and off. The flags represent the not-mandatory, mandatory, and value set. Based on the flags, the configuration variables can be controlled. In one or more embodiments of the invention, the developer can control the mandatory and not mandatory flags. The value set flag is controlled internally in accordance with one or more embodiments of the invention.

The variable data structure also includes configuration variable levels (e.g., configuration variable 1 levels (122), configuration variable n levels (124). In one or more embodiments of the invention, the configuration variable levels (e.g., configuration variable 1 levels (122), configuration variable n levels (124)) maintain information for accessing the values of the configuration variables. Specifically, each configuration variable has one or more possible values and the access to the values are maintained in the configuration variable levels (e.g., configuration variable 1 levels (122), configuration variable n levels (124)). Each configuration variable level corresponds to a possible value for the configuration variable. As shown in FIG. 1, the number of levels for each configuration variable may not be the same in accordance with one or more embodiments of the invention. For example, one configuration variable may have four levels while another configuration level may have eight levels.

In addition, the configuration variable levels (e.g., configuration variable 1 levels (122), configuration variable n levels (124)) maintain the priority semantic for a particular configuration variable. The priority semantic defines which possible value for a configuration variable takes precedence over other possible values.

Because the priority semantic is associated with a particular configuration variable, the priority semantic can be heterogeneous across the configuration variables. Specifically, the priority semantics associated with the configuration variables may be non-uniform. For example, one or more configuration variables may be associated with a particular priority semantic, while another set of configuration variables can be associated with an entirely different priority semantic. As another example, the priority semantic associated each configuration variable may be distinct from the priority semantic associated with other configuration variables in the configuration repository.

The priority semantic may be defined implicitly or explicitly by the configuration variable levels (e.g., configuration variable 1 levels (122), configuration variable n levels (124)). The priority semantic is implicit if the value is defined by the order of the configuration variable levels (e.g., configuration variable 1 levels (122), configuration variable n levels (124)). For example, the first configuration variable level has less priority over the last configuration variable level. Alternatively, the priority semantic is explicit if the configuration variable level includes an explicit marker, such as a number, that orders the configuration variable levels (e.g., configuration variable 1 levels (122), configuration variable n levels (124)).

Those skilled in the art will appreciate that the priority semantic of a configuration variable may be defined by a pointer in the configuration variable data structure. Specifically, multiple general priority semantics can be defined outside of the configuration variable data structure. A pointer within the configuration variable data structure can link to the priority semantic for the particular configuration variable.

Continuing with FIG. 1, each configuration variable level includes a variable argument (e.g., variable 1 argument a (140), variable 1 argument k (142), variable n argument l (144), variable n argument j (146)) and a variable function (e.g., variable 1 function 1 (150), variable 1 function k (152), variable n function 1 (154), variable n function j (156)).

A variable argument (e.g., variable 1 argument a (140), variable 1 argument k (142), variable n argument a (144), variable n argument j (146)) defines a location of a possible value of a configuration variable in accordance with one or more embodiments of the invention. The location may correspond to the argument itself (i.e., the possible value is directly stored in the configuration variable level), a file (e.g., a configuration file), argument passed through an interface (e.g., argument of a command line interface, graphical user interface, application programming interface, etc.), an environmental variable, an extensible markup language (XML) document, default value location, or any other source of possible values of a configuration variable.

A variable function (e.g., variable 1 function a (150), variable 1 function k (152), variable n function a (154), variable n function j (156)) defines how to access the value in accordance with one or more embodiments of the invention. In one or more embodiments of the invention, the variable function (e.g., variable 1 function a (150), variable 1 function k (152), variable n function 1 (154), variable n function j (156)) corresponds to a pointer to a programming language function, method, script, etc. For example, if the variable argument corresponds to a configuration file, then the variable function may correspond to a pointer to a function that includes functionality to identify which value in the configuration file corresponds to the value for the argument. As another example, if the variable argument corresponds to an argument of a command line interface that is indicated by a preceding character (e.g., "−a"), the variable function may identify how to parse the argument (e.g., transform into an integer, string, etc.).

Those skilled in the art will appreciate that other information may be maintained in each configuration variable level. For example, each configuration variable level may also maintain a flag indicating whether the value exists in the configuration variable level.

Continuing with the variable data structure (e.g., variable 1 data structure (110), variable n data structure (112)), the variable value (e.g., variable 1 value (126), variable n value (128)) maintains the current value of the configuration variable in accordance with one or more embodiments of the invention. Specifically, the variable value (e.g., variable 1 value (126), variable n value (128)) may correspond to a reference, such as a pointer, to the configuration variable. The variable value (e.g., variable 1 value (126), variable n value (128)) allows for quick access to the current value of the configuration variable.

Continuing with FIG. 1, a configuration library (104) is connected to the program (100). The configuration library (104) maintains the functions for accessing the values of the configuration variables. Specifically, in one or more embodiment of the invention, the functions defined in the configuration library (104) are used to configure the program (100). The functions include a configuration function (not shown), a configuration only mandatory function (not shown), a reconfiguration function (not shown), and a get variable function (not shown) in accordance with one or more embodiments of the invention. Each of the aforementioned functions is described below.

A configuration function includes functionality to configure the program (100). Specifically, in one or more embodiments of the invention, the configuration function receives as a parameter the configuration variable repository (102) or a link to the configuration variable repository (102) and includes functionality to configure the program (100) using the configuration variable repository (102). Configuring the program (100) includes setting the values for configuration variables in the program (100). Further, in one or more embodiments of the invention the configuration function includes functionality to return an error indicator if a mandatory configuration variable cannot be set.

The configuration only mandatory function is similar to the configuration function. However, the configuration only mandatory function includes functionality to determine which configuration variables are mandatory and configure only the mandatory configuration variables.

The reconfiguration function is also similar to the configuration function. However, the reconfiguration function is used while the program (100) is executing. Specifically, the reconfiguration function includes functionality to set a reconfigure signal to the program to configure configuration variables. For example, the reconfigure signal corresponds to the "Sighup" signal, or other such signal. In one or more embodiment of the invention, the reconfiguration function is a "wrapper" function. Specifically, the reconfiguration function includes a call to the configuration function after setting the signal in accordance with one or more embodiments of the invention. Those skilled in the art will appreciate that using the same "wrapper" premise, a developer may create further "wrapper" functions, such as reconfigure only mandatory function, etc.

Another function in the configuration library is the "get" variable function. The "get" variable function allows access to the value of the configuration variable. In one or more embodiments of the invention, the "get" variable function uses as parameters the configuration variable repository (102) or a link thereto, the variable name (e.g., variable 1 name (114), variable n name (116)), a pointer where the value should be stored when the function returns, and an indication whether the current value should be used or whether the current value should be recalculated using the priority semantic. The "get" variable function includes functionality to identify the configuration variable by variable name (e.g., variable 1 name (114), variable n name (116)) in the configuration variable repository (102) and either obtain the current value of the configuration variable from the variable value (e.g., variable 1 value (126), variable n value (128)) or recalculate the current value using priority semantic defined in the configuration variable levels (e.g., configuration variable 1 levels (122), configuration variable n levels (124)) in accordance with one or more embodiments of the invention. The get variable function further includes functionality to set the pointer parameter equal to the obtained value of the configuration variable.

Using the configuration variable repository (102) and the configuration library (104), the program (100) can easily be configured and reconfigured using configuration variable that have heterogeneous priority semantics.

Figure 2:
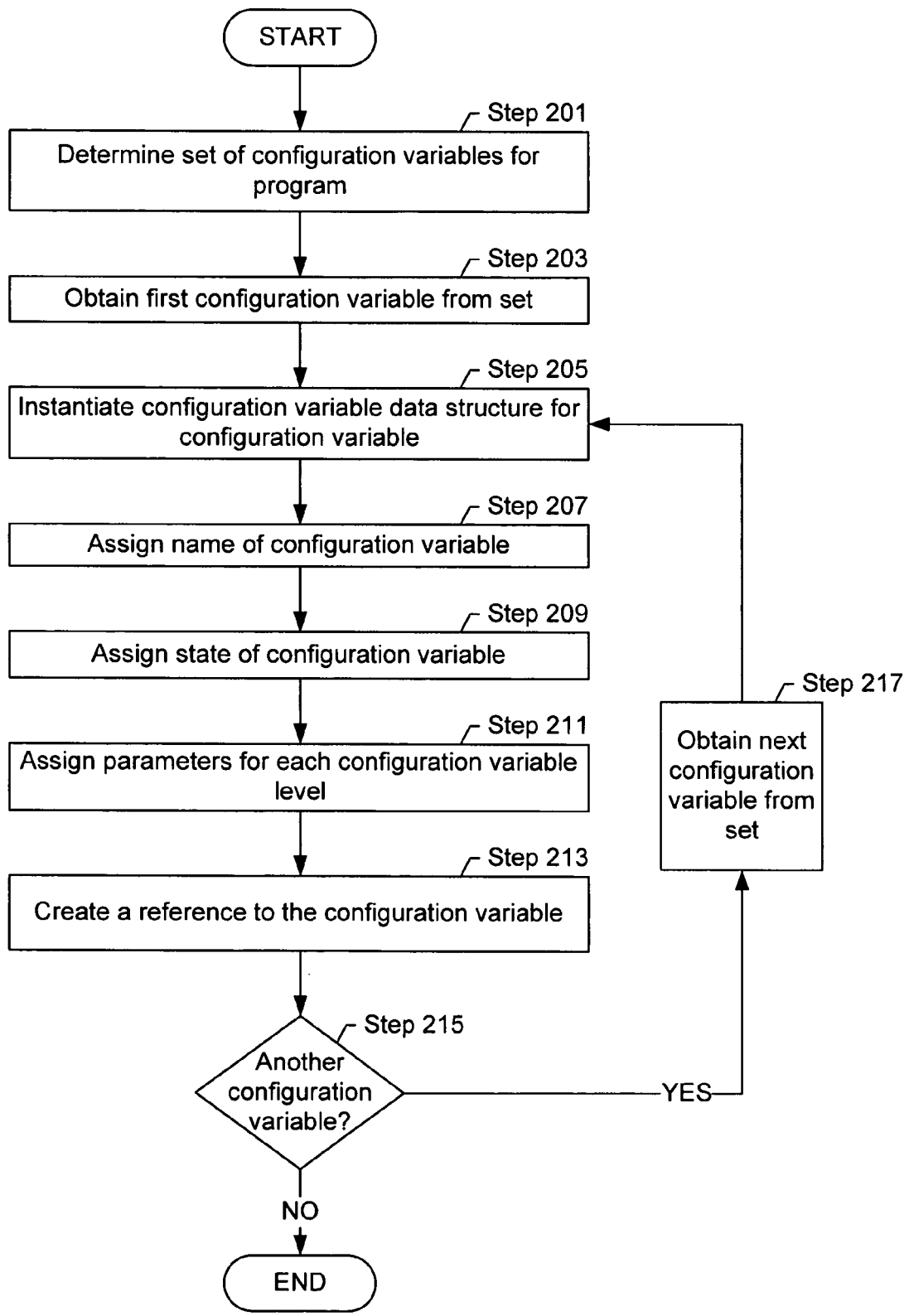
FIG. 2 shows a flowchart of a method for populating a configuration variable repository for a program in accordance with one or more embodiments of the invention.

FIG. 2 shows a flowchart of a method for populating a configuration variable repository for a program in accordance with one or more embodiments of the invention. Initially, the set of configuration variables for the program is determined (Step 201). Determining the set of configuration variables for a program is usually performed while the developer is developing the program. Typically, a developer identifies a set of configuration variables, such as communication port, log file, memory size blocks, international localization, etc., based on requirements, the program, and the various environments in which the program is expected to execute.

Next, the first configuration variable from the set is obtained (Step 203). The first configuration variable may correspond to any configuration variable in the set.

After obtaining the first configuration variable, a configuration variable data structure is dedicated to the configuration variable (Step 205). Specifically, space is reserved for the configuration variable and the configuration variable data structure is populated with the characteristics, such as the name, etc., of the current configuration variable.

The variable name of the configuration variable is next assigned to the configuration variable data structure (Step 207). Specifically, a developer, or other individual, chooses a name (e.g., "Sector Names") that will be used outside of the program. The variable name field of the data structure is then assigned the value of the chosen name.

In addition, the variable state of the configuration variable is assigned to the configuration variable data structure (Step 209). At this stage, the developer or the program detects whether the configuration variable is mandatory. If the configuration variable is mandatory, then the variable state is set to indicate that the configuration variable is mandatory.

Further, the parameters for each configuration variable level are assigned (Step 211). Specifically, a structure for the configuration variable levels is instantiated. The number of levels is determined by the number of allowable sources for the value of the configuration variable. Each level is populated with the associated variable argument and variable function. In one or more embodiments of the invention, the levels are populated according to how a developer wants to set up the priority semantic. Specifically, at this stage the developer sets the priority semantic for the configuration variable.

Next, the locations specified by the variable argument of the configuration variable are populated with values (Step 213) in accordance with one or more embodiments of the invention. Specifically, the possible values are assigned created in the location specified by the variable argument. At this stage, only known values (e.g., default values) are populated.

For example, suppose the default value for the location of a log file is at program_files/my_program/logfile.ext. Then, at this stage, the value program_files/my_program/logfile.ext may be added to the configuration file. Thus, when the program is to obtain the configuration value for the location of the log file, at a later time, then program can use the value written in the configuration file in accordance with one or more embodiments of the invention. Those skilled in the art will appreciate that at any stage, a location may be populated with a possible value depending on the location. For example, in one or more embodiments of the invention, a location corresponding to a command line argument for a configuration variable is only populated directly before execution of the program.

Next, a determination is made whether another configuration variable exists in the set that has not been processed (Step 215). If another configuration variable exists, then the next configuration variable is obtained (Step 217). Accordingly, the method repeats with instantiating a configuration variable data structure for the next configuration variable (Step 205).

Figure 3:
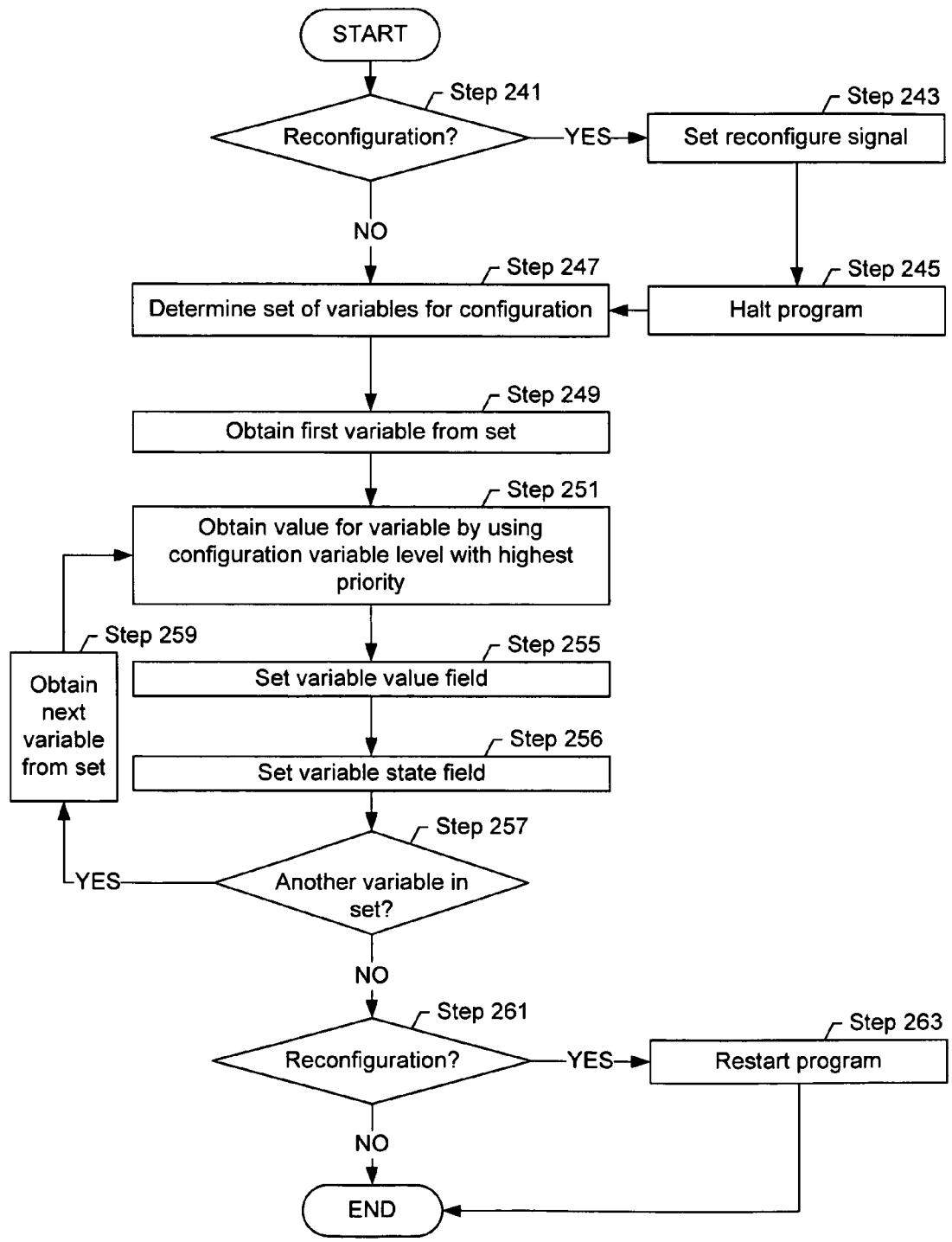
FIG. 3 shows a flowchart of a method for configuration of a program in accordance with one or more embodiments of the invention.

Once the configuration variable repository is populated and the priority semantics are defined, then the configuration variable repository can be used to configure a program. FIG. 3 shows a flowchart of a method for configuration of a program in accordance with one or more embodiments of the invention.

Initially, a determination is made whether the configuration is a reconfiguration of the program (Step 241). Specifically, a determination is made whether the program is already executing and should obtain the configuration variables again. If the program is executing, then the reconfigure signal is set (Step 243). Specifically, in one or more embodiments of the invention, the sighup signal is set.

After the reconfigure signal is set, the program halts (Step 245). Specifically, the program is interrupted and a procedure handler is called to allow the program to receive new values for the configuration variables. The procedure handler may subsequently call a configure function.

Typically, the program halts only at a safe portion of the program in accordance with one or more embodiments of the invention. Specifically, the program is reconfigured only when reconfiguring the program will not inversely affect the program.

Once the program is halted or if the configuration is not a reconfiguration, the set of variables for configuration are determined (Step 247) in accordance with one or more embodiments of the invention. The set of variables may correspond to the entire set of configuration variables used in the program or a subset thereof. For example, rather than configuring the entire set of configuration variables, only the mandatory configuration variables are configured, or only the variables belonging to a certain category (e.g., networking, security, or any other such category) are configured. Accordingly, the set of variables may include the set of names of the configuration variables, an indication of all the configuration variables, or a property or category of the configuration variable.

After determining the set of configuration variables, the first variable is obtained from the set (Step 249). The variable that is obtained corresponds to any variable in the configuration variable repository that has the name, category, or property referred to in the set. For example, if the set includes an indication that all variables are in the set, then the first variable in the repository is the obtained variable. In another example, if the set corresponds to the set of networking variables, then the first variable in the configuration repository that is a networking variable is obtained.

Next, value for the variable is obtained by using the configuration variable level with the highest priority (Step 251). Specifically, at this stage, the priority semantic of the configuration variable is determined. The levels in the configuration variable levels are checked according to the priority semantic to obtain the value with the highest priority.

In one or more embodiments of the invention, obtaining the value with the highest priority may be performed by identifying the lowest configuration variable level (i.e., the configuration variable level with the least priority). The variable function may be called with the variable argument of the lowest configuration variable level in order to obtain the variable value. Specifically, the location is found from the variable argument and the value is obtained according to the variable function. For example, if the variable argument specifies a file, then the file is obtained. Next, the value is obtained by traversing the file as specified in the variable function. After obtaining the value with the least priority, then the next configuration variable level having the next lowest priority may be obtained to determine whether a value exists for the next configuration variable level. If a value exists, then the value may replace the previously obtained value. Thus, the steps for obtaining the value may repeat until the value with the highest priority that exists is obtained.

Alternatively, rather than traversing the variable data structure from least priority to highest priority, the variable data structure may be traversed from highest priority to least priority in accordance with one or more embodiments of the invention to identify the first value that exists and has the highest priority. In the aforementioned alternative, the location with the highest priority is checked to determine whether a value exists. If a values does not exist, then the location with the next highest priority is checked to determine whether a value with the next highest priority exists. The method may repeat until the value with the highest priority is found.

In addition, at this stage, the variable value field of the variable data structure is set to reflect that the current value is the obtained value (Step 255). At this stage, the value can be assigned to the associated configuration variable in the program. Also at this stage, the variable state field is also set (Step 256).

Continuing with FIG. 3, once the current value is obtained, then a determination is made whether another variable in the set exists that has not been processed (Step 257). If another variable exists, then the next variable from the set is obtained (Step 259). Accordingly, the method repeats with processing the next variable.

Alternatively, once all variables in the set are processed, then a determination is made whether the configuration is a reconfiguration (Step 261). If the configuration is a reconfiguration, then the program is restarted at the location in which the program was halted (Step 263) in accordance with one or more embodiments of the invention.

When the values for the variables in the set are obtained and assigned to the configuration variables, then the program can execute using the newly obtained values. At any time after setting up the data structure and during the lifetime of the program, the value (i.e., the currently used value or the value with the highest priority) for any of the configuration variables can be obtained.

Figure 4:
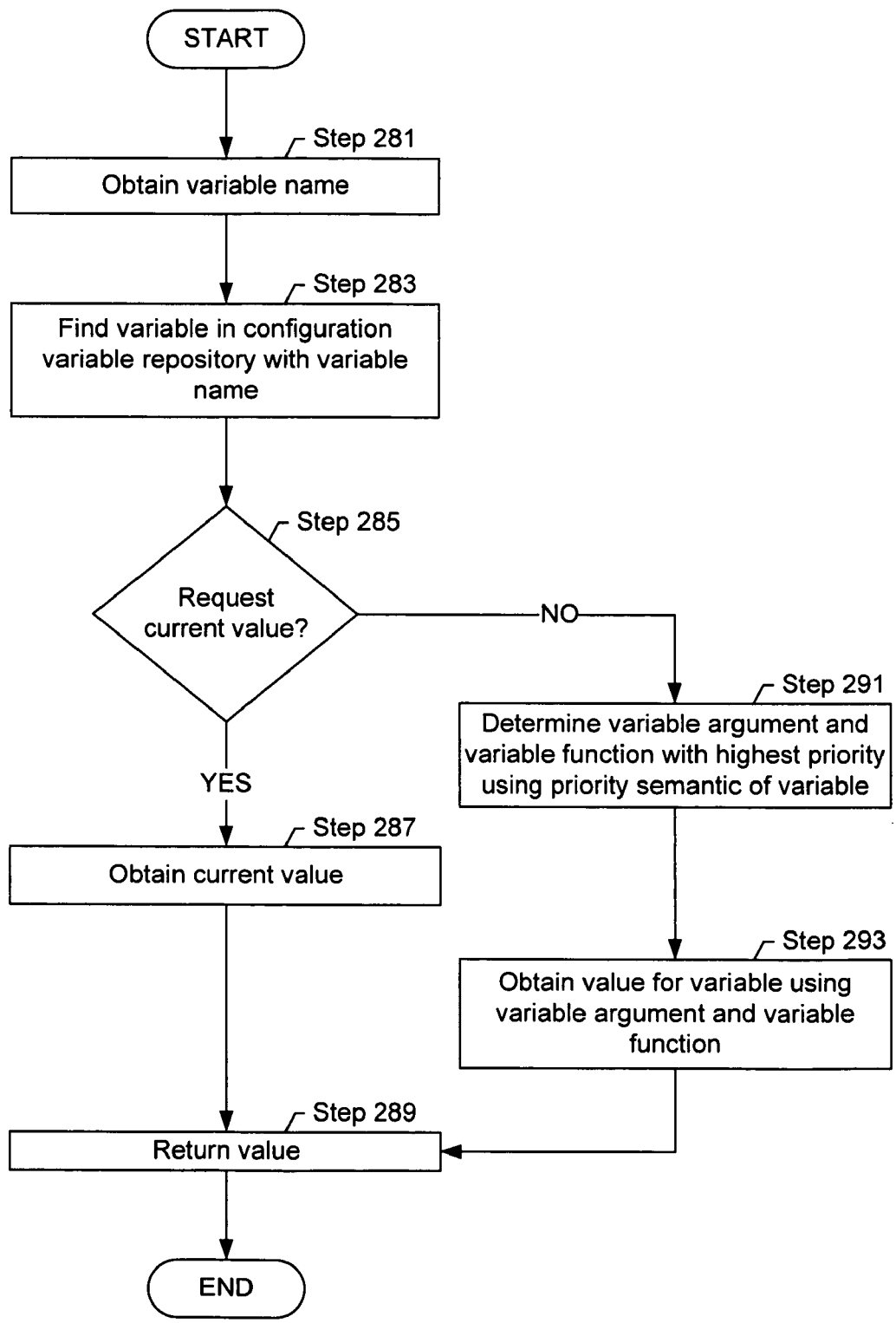
FIG. 4 shows a flowchart of a method for obtaining the value of a configuration variable based on the variable name in accordance with one or more embodiments of the invention.

FIG. 4 shows a flowchart of a method for obtaining the value of a configuration variable based on the variable name in accordance with one or more embodiments of the invention. Initially, the variable name is obtained (Step 281). The obtained variable name corresponds to the name within the variable data structure (e.g., "Sector Names") in accordance with one or more embodiments of the invention. The name may be obtained as a parameter sent from the individual or program requesting the value. Next, the configuration variable repository is searched for the variable having the variable name (Step 283).

After finding the variable in the configuration repository, a determination is made whether the current valued is requested (Step 285). The current value is the value in use by the configuration program. An administrator or other such user may want to know which values are in use by the program without changing the values. Accordingly, if the current value is requested, then the current value is obtained (Step 287). Specifically, at this stage the variable value field is used to determine which value is currently set.

Next, the current value is returned (Step 289). Returning the value may include sending the value directly, changing a commonly known reference variable to reference the value, or returning the reference directly.

Alternatively, if the current value is not requested, then the variable argument and the variable function with the highest priority semantic of the variable is determined (Step 291). Next, the value for the variable is returned using the obtained variable argument and variable function (Step 293). Step 291 and Step 293 of FIG. 4 can be performed in a similar manner to Step 251 and Step 255 of FIG. 3. Once the value with the highest priority is obtained, then the value is returned (Step 289).

As shown in FIG. 4, any individual or program can easily obtain values for configuration variables by referring to the natural name of the configuration variable. Accordingly, testing and administering an application is simplified by allowing for the values to be easily obtained.

In the following example, consider the case in which a program only uses three possible configuration variables: "varLogFile," "varPortConnection," and "varPassword." "varLogFile" holds the file name for a log file of the program. "varPortConnection" maintains the port name that should be used by the program for network connections. Finally, "varPassword" maintains the password for accessing a database that the program requires. Further, assume that "varLogFile" and "varPassword" are mandatory variables, and "varPortConnection" is not mandatory.

In the example, the configuration variable repository corresponds to an array that is populated with variable data structures of type "configVariable." The "configVariable" for "varLogFile" has "Log file" as the variable name, "mandatory" as the variable state, and the following order (from lowest to highest) for a priority semantic: a "program.log" file is set as the default value, a path name of a configuration variable in a configuration file, an environment variable, and a command line argument.

Continuing with the example, the "configVariable" for "varPortConnection" has "Port Connection" as the variable name, "not mandatory" as the variable state, and the following order (from lowest to highest) for a priority semantic: no default value, a path name of a configuration variable in a configuration file, an environment variable, and a command line argument.

Lastly, the "configVariable" for "varPassword" has "Password" as the variable name, "mandatory" as the variable state, and the following order (from lowest to highest) for a priority semantic: only the command line argument is set to force a user to submit the password in order to execute the program.

When the values of the configuration variables in the example are obtained, then the values are obtained in the order specified by the developer. Specifically, in order to execute the program, the user is forced to type in the password. Similarly, with the log file as a mandatory variable, the location of the log file automatically exists by having a default value for the log file. Accordingly, the developer of the program has full control of how to obtain the configuration values for each individual configuration value.

Figure 5:
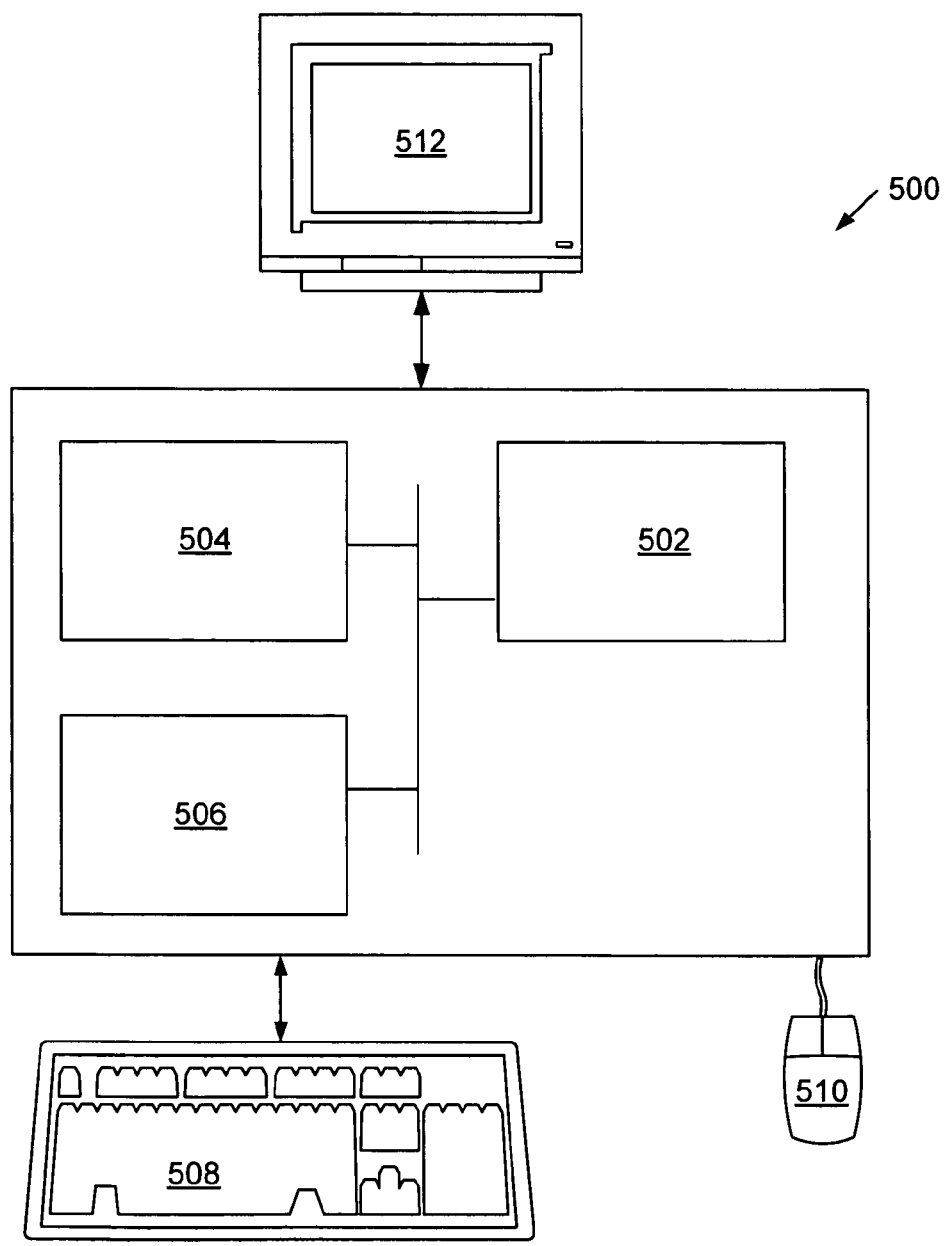
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., configuration library functions, program, configuration levels, variable states, variable name, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention provide a mechanism for creating a prioritized semantic to the configuration processing of a program. Specifically, by allowing a developer to define how the configuration variables obtain values, the developer can have greater control over the configuration of the program. Such control ensures greater functionality within program and decreases the number of unintentional errors that are cause by errors in modifying the configuration variable.

Further embodiments of the invention create a mechanism whereby maintenance, redesigning and enlargement of the configuration of a program is performed with minimal overhead or complication. Specifically, an individual can easily use the tools within the configuration library or develop new tools based on the data structures in order to have greater configuration functionality.

Additionally, embodiments of the invention provide a mechanism whereby the individual has control of when and which configuration variables are configured. Specifically, because subsets of the set of all configuration variables can be configured separately, the overhead associated with configuring all configuration variables is avoided.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuration of a single program with a plurality of configuration variables to operate on a computer system comprising:
    identifying a first plurality of configuration variable levels from a configuration variable repository corresponding to the single program,
        wherein each of the first plurality of configuration variable levels is associated with a location of a possible value for a first configuration variable of the plurality of configuration variables, and
        wherein the first plurality of configuration variable levels defines a first priority semantic for locations of possible values for the first configuration variable;
    identifying a second plurality of configuration variable levels from the configuration variable repository,
        wherein each of the second plurality of configuration variable levels is associated with a location of a possible value for a second configuration variable of the plurality of configuration variables, and
        wherein the second plurality of configuration variable levels defines a second priority semantic for locations of possible values for the second configuration variable, and
        wherein the first priority semantic and the second priority semantic are different;
    assigning, using a first configuration variable level of the first plurality of configuration variable levels, a first value to the first configuration variable based on the first priority semantic;
    assigning, using a second configuration variable level of the second plurality of configuration variable levels, a second value to the second configuration variable based on the second priority semantic; and
    configuring the program using the first value and the second value to operate on the computer system.

2. The method of claim 1, wherein the configuration variable repository comprises only a subset of a plurality of configurable variables in the program.

3. The method of claim 2, wherein the subset is a plurality of mandatory configuration variables in a program.

4. The method of claim 1, wherein assigning the first value comprises:
    obtaining the first value with a highest priority by using a function and an argument,
    wherein the function and the argument is stored in the first configuration level, and
    wherein the first configuration level has the highest priority, with a defined value, as defined by the first priority semantic.

5. The method of claim 1, further comprising:
    setting a reconfigure signal for the program; and
    halting the program at a safe location based on the reconfigure signal before configuring the program.

6. A computer system comprising:

a processor configured to execute a program using a first configuration variable and a second configuration variable; and memory configured to store a configuration variable repository corresponding to the single program, the configuration variable repository comprising:

a first data structure for the first configuration variable of the program, the first data structure comprising:

a first element comprising a first argument defining a location of a first value for the first configuration variable; and a second element comprising a second argument defining a location of a second value for the first configuration variable, wherein the first data structure defines a first priority semantic for the first argument and the second argument; and a second data structure for the second configuration variable of the program, the second data structure comprising:

a third element comprising a third argument defining a location of a third value for the second configuration variable; and a fourth element comprising a fourth argument defining a location of a fourth value for the second configuration variable, wherein the second data structure defines a second priority semantic for the third argument and the fourth argument, wherein the first priority semantic and the second priority semantic are different, and wherein the first priority semantic and the second priority semantic are used to configure the program to operate on the computer system.

7. The computer system of claim 6, wherein the first data structure further comprises:

a fifth element comprising a variable name of the first configuration variable.

8. The computer system of claim 7, wherein the variable name is a natural name.

9. The computer system of claim 6, wherein the data structure further comprises:

a fifth element comprising a variable state of the first configuration variable.

10. The computer system of claim 9, wherein the variable state specifies whether the configuration is mandatory.

11. The computer system of claim 9, wherein the variable state specifies whether the first configuration variable is set.

12. The computer system of claim 6, wherein the first data structure further comprises:

a fifth element comprising a variable value of the first configuration variable.

13. The computer system of claim 12, wherein the variable value comprises a reference to a current value of the first configuration variable.

14. The computer system of claim 6, wherein the first argument identifies a location of the first value.

15. The computer system of claim 14, wherein the first element comprises a function for obtaining the first value from the first location.

16. The computer system of claim 6, wherein the first data structure is a struct.

17. A computer readable storage medium having computer readable program code embodied therein for causing a computer system to:

identify a first plurality of configuration variable levels from a configuration variable repository corresponding to a single program, wherein each of the first plurality of configuration variable levels is associated with a location of a possible value for a first configuration variable of the plurality of configuration variables, and wherein the first plurality of configuration variable levels defines a first priority semantic for locations of possible values for the first configuration variable;

identify a second plurality of configuration variable levels from the configuration variable repository, wherein each of the second plurality of configuration variable levels is associated with a location of a possible value for a second configuration variable of the plurality of configuration variables, and wherein the second plurality of configuration variable levels defines a second priority semantic for locations of possible values for the second configuration variable, and wherein the first priority semantic and the second priority semantic are different;

assign, using a first configuration variable level of the first plurality of configuration variable levels, a first value to the first configuration variable based on the first priority semantic;

assign, using a second configuration variable level of the second plurality of configuration variable levels, a second value to the second configuration variable based on the second priority semantic; and configure the program using the first value and the second value to operate on the computer system.

18. The computer readable storage medium of claim 17, wherein assigning the first value comprises:

obtaining the first value with a highest priority by using a function and an argument, wherein the function and the argument is stored in the first configuration level, and wherein the configuration level has the highest priority as defined by the first priority semantic.

* * * * *